United States Patent
Cherganski et al.

(10) Patent No.: US 12,026,924 B1
(45) Date of Patent: Jul. 2, 2024

(54) METHOD AND DATA PROCESSING SYSTEM FOR LOSSY IMAGE OR VIDEO ENCODING, TRANSMISSION AND DECODING

(71) Applicant: DEEP RENDER LTD, London (GB)

(72) Inventors: Aleksandar Cherganski, London (GB); Chris Finlay, London (GB); Christian Etmann, London (GB); Arsalan Zafar, London (GB)

(73) Assignee: DEEP RENDER LTD., London (GB)

( * ) Notice: Subject to any disclaimer, the term of this patent is extended or adjusted under 35 U.S.C. 154(b) by 0 days.

(21) Appl. No.: 18/458,556

(22) Filed: Aug. 30, 2023

(30) Foreign Application Priority Data

Feb. 19, 2023 (GB) ...................................... 2302350
Mar. 22, 2023 (GB) ...................................... 2304148

(51) Int. Cl.
 *G06T 9/00* (2006.01)
(52) U.S. Cl.
 CPC ..................... *G06T 9/002* (2013.01)
(58) Field of Classification Search
 CPC ...................................................... G06T 9/002
 (Continued)

(56) References Cited

FOREIGN PATENT DOCUMENTS

WO  2021220008 A1   11/2021
WO  WO 2022/08702   *  4/2022

OTHER PUBLICATIONS

Agustsson, E., et al., (2020), Scale-space flow for end-to-end optimized video compression. In Proceedings of the IEEE/CVF Conference on Computer Vision and Pattern Recognition (pp. 8503-8512).

(Continued)

*Primary Examiner* — Mark Roz
(74) *Attorney, Agent, or Firm* — Saul Ewing LLP

(57) ABSTRACT

A method of training one or more neural networks, the one or more neural networks being for use in lossy image or video encoding, transmission and decoding, the method comprising the steps of: receiving an input image at a first computer system; encoding the input image using a first neural network to produce a latent representation; decoding the latent representation using a second neural network to produce an output image, wherein the output image is an approximation of the input image; evaluating a function based on a difference between the output image and the input image; updating the parameters of the first neural network and the second neural network based on the evaluated function; and repeating the above steps using a first set of input images to produce a first trained neural network and a second trained neural network; wherein the difference between the output image and the input image is determined based on the output of a neural network acting as a discriminator; the parameters of the neural network acting as a discriminator are additionally updated based on the evaluated function; and the parameters of the neural network acting as a discriminator are updated at a first learning rate; wherein, after at least one of the updates of the parameters of the neural network acting as a discriminator, the first learning rate is updated; and the update to the first learning rate is based on an error of the output of the neural network acting as a discriminator.

15 Claims, 4 Drawing Sheets

(58) Field of Classification Search
USPC .......................................................... 706/15
See application file for complete search history.

(56) References Cited

OTHER PUBLICATIONS

Balle, Johannes, et al., "Variational image compression with a scale hyperprior." arXiv preprint arXiv:1802.01436 (2018).
Mentzer, F., et al., (Nov. 2022). Neural video compression using gans for detail synthesis and propagation. In Computer Vision—ECCV 2022: 17th European Conference, Tel Aviv, Israel, Oct. 23-27, 2022, Proceedings, Part XXVI (pp. 562-578).
Pourreza, R., et al., (2021). Extending neural p-frame codecs for b-frame coding. In Proceedings of the IEEE/CVF International Conference on Computer Vision (pp. 6680-6689).

* cited by examiner

METHOD AND DATA PROCESSING SYSTEM FOR LOSSY IMAGE OR VIDEO ENCODING, TRANSMISSION AND DECODING

CROSS-REFERENCE TO RELATED APPLICATIONS

This application claims priority to GB Application No. GB 2302350.0, filed on Feb. 19, 2023, and GB Application No, GB 2304148.6, filed on Mar. 22, 2023, the entire contents of which being fully incorporated herein by reference.

FIELD OF THE INVENTION

This invention relates to a method and system for lossy image or video encoding, transmission and decoding, a method, apparatus, computer program and computer readable storage medium for lossy image or video encoding and transmission, and a method, apparatus, computer program and computer readable storage medium for lossy image or video receipt and decoding.

There is increasing demand from users of communications networks for images and video content. Demand is increasing not just for the number of images viewed, and for the playing time of video; demand is also increasing for higher resolution content. This places increasing demand on communications networks and increases their energy use because of the larger amount of data being transmitted.

To reduce the impact of these issues, image and video content is compressed for transmission across the network. The compression of image and video content can be lossless or lossy compression. In lossless compression, the image or video is compressed such that all of the original information in the content can be recovered on decompression. However, when using lossless compression there is a limit to the reduction in data quantity that can be achieved. In lossy compression, some information is lost from the image or video during the compression process. Known compression techniques attempt to minimise the apparent loss of information by the removal of information that results in changes to the decompressed image or video that is not particularly noticeable to the human visual system. JPEG, REG2000, AVC, HEVC and AVI are examples of compression processes for image and/or video files.

In general terms, known lossy image compression techniques use the spatial correlations between pixels in images to remove redundant information during compression. For example, in an image of a blue sky, if a given pixel is blue, there is a high likelihood that the neighbouring pixels, and their neighbouring pixels, and so on, are also blue. There is accordingly no need to retain all the raw pixel data. Instead, we can retain only a subset of the pixels which take up fewer bits and infer the pixel values of the other pixels using information derived from spatial correlations.

A similar approach is applied in known lossy video compression techniques. That is, spatial correlations between pixels allow the removal of redundant information during compression. However, in video compression, there is further information redundancy in the form of temporal correlations. For example, in a video of an aircraft flying across a blue-sky background, most of the pixels of the blue sky do not change at all between frames of the video. The most of the blue sky pixel data for the frame at position t=0 in the video is identical to that at position t=10. Storing this identical, temporally correlated, information is inefficient. Instead, only the blue sky pixel data for a subset of the frames is stored and the rest are inferred from information derived from temporal correlations.

In the realm of lossy video compression in particular, the removal of redundant temporally correlated information in a video sequence is known inter-frame redundancy.

One technique using inter-frame redundancy t is widely used in standard video compression algorithms involves the categorization of video frames into three types: I-frames, P-frames, and B-frames. Each frame type carries distinct properties concerning their encoding and decoding process, playing different, roles in achieving high compression ratios while maintaining acceptable visual quality.

I-frames, or intra-coded frames, serve as the foundation of the video sequence. These frames are self-contained, each one encoding a complete image without reference to any other frame. In terms of compression, I-frames are least compressed among all frame types, thus carrying the most data. However, their independence provides several benefits, including being the starting point for decompression and enabling random access, crucial for functionalities like fast-forwarding or rewinding the video.

P-frames, or predictive frames, utilize temporal redundancy in video sequences to achieve greater compression. Instead of encoding an entire image like an I-frame, a P-frame represents the difference between itself and the closest preceding I- or P-frame. The process, known as motion compensation, identities and encodes only the changes that have occurred, thereby significantly reducing the amount of data transmitted. Nonetheless, P-frames are dependent on previous frames for decoding. Consequently, any error during the encoding or transmission process may propagate to subsequent frames, impacting the overall video quality.

B-frames, or bidirectionally predictive frames, represent the highest level of compression. Unlike P-frames, B-frames use both the preceding and following frames as references in their encoding process. By predicting motion both forwards and backwards in time, B-frames encode only the differences that cannot be accurately anticipated from the previous and next frames, leading to substantial data reduction. Although this bidirectional prediction makes B-frames more complex to generate and decode, it does not propagate decoding errors since they are not used as references for other frames. Artificial intelligence (AI) based compression techniques achieve compression and decompression of images and videos through the use of trained neural networks in the compression and decompression process. Typically, during training of the neutral networks, the difference between the original image and video and the compressed and decompressed image and video is analyzed and the parameters of the neural networks are modified to reduce this difference while minimizing the data required to transmit the content. However, AI based compression methods may achieve poor compression results in terms of the appearance of the compressed image or video or the amount of information required to be transmitted.

An example of an AI based image compression process comprising a hyper-network is described in Bane, Johannes, et al. "Variational image compression with a scale hyperprior." arXiv preprint arXiv:1802.01436 (2018), which is hereby incorporated by reference.

An example of an AI based video compression approach is shown in Agustsson, E., Minnen, D., Johnston, N., Balle, J., Hwang, S. J., and Toderici, G. (2020), Scale-space flow for end-to-end optimized video compression. In Proceedings of the WEE/CVF Conference on Computer Vision and Pattern Recognition (pp. 8503-8512), which is hereby incorporated by reference.

A further example of an AI based video compression approach is shown in Mentzer, F., Agustsson, E., Ballé, J., Minnen, D., Johnston, N., and Toderici, G. (2022, November). Neural video compression using Bans for detail synthesis and propagation. In Computer Vision-ECCV 2022: 17th European Conference, Tel Aviv, Israel, Oct. 23-27, 2022, Proceedings, Part XXVI (pp. 562-578), which is hereby incorporated by reference.

SUMMARY OF THE INVENTION

According to the present invention there is provided a method of training one or more neural networks, the one or more neural networks being for use in lossy image or video encoding, transmission and decoding, the method comprising the steps of: receiving an input image at a first computer system; encoding the input image using a first neural network to produce a latent representation; decoding the latent representation using a second neural network to produce an output image, wherein the output image is an approximation of the input image; evaluating a function based on a difference between the output image and the input image; updating the parameters of the first neural network and the second neural network based on the evaluated function; and repeating the above steps using a first set of input images to produce a first trained neural network and a second trained neural network; wherein the difference between the output image and the input image is determined based on the output of a neural network acting as a discriminator; the parameters of the neural network acting as a discriminator are additionally updated based on the evaluated function; and the parameters of the neural network acting as a discriminator are updated at a first learning rate; wherein, after at least one of the updates of the parameters of the neural network acting as a discriminator, the first learning rate is updated; and the update to the first learning rate is based on an error of the output of the neural network acting as a discriminator.

The error may be based on a difference between the output of the neural network acting as a discriminator and a target value.

The target value may be predetermined.

The target value may be modified in at least one of the repeats of the training steps.

The update to the first learning rate may be based on a calculation comprising the error.

The update to the first learning rate may be based on a calculation comprising the integral of the error.

The update to the first learning rate may be based on a calculation comprising the derivative of the error.

The contribution of at least one of the error, the integral of the error and the derivative of the error may be scaled by a predetermined value.

The update to the first learning rate may be additionally based on an update to the first learning rate in at least one previous repeat of the training steps.

The update to the first learning rate may comprise the step of: determining a current modification of the first learning rate based on an error of the output of the neural network acting as a discriminator; and the update to the first learning rate is based on an average of the current modification of the first learning rate and the update to the first learning rate in at least one previous repeat of the training steps.

The average may be an exponential moving average.

The update to the first learning rate may be based on the output of a gradient descent algorithm which receives the error of the output of the neural network acting as a discriminator as an input.

The gradient descent algorithm may be one of the following algorithms: SCD, Adagrand, RMSProp or Adam.

According to the present invention there is provided a method of training one or more neural networks, the one or more neural networks being for use in lossy image or video encoding, transmission and decoding, the method comprising the steps of: receiving an input image at a first computer system; encoding the input image using a first neural network to produce a latent representation; decoding the latent representation using a second neural network to produce an output image, wherein the output image is an approximation of the input image; evaluating a function based on a difference between the output image and the input image and the rate of the latent representation; updating the parameters of the first neural network and the second neural network based on the evaluated function; and repeating the above steps using a first set of input images to produce a first trained neural network and a second trained neural network; wherein at the contribution of at least one of the difference between the output image and the input image and the rate of the latent representation to the function is scaled by a first parameter; after at least one of the updates of the parameters of the first neural network and the second neural network, the first parameter is updated; and the update to the first parameter is based on an error of the at least one of the difference between the output image and the input image and the rate of the latent representation.

According to the present invention there is provided a method for lossy image or video encoding, transmission and decoding, the method comprising the steps of: receiving an input image at a first computer system; encoding the input image using a first trained neural network to produce a latent representation; transmitting the latent representation to a second computer system; decoding the latent representation using a second trained neural network to produce an output image, wherein the output image is an approximation of the input image; wherein at least one of the first trained neural network and the second trained neural network has been trained according to the method above.

According to the present invention there is provided a method for lossy image or video encoding and transmission, the method comprising the steps of: receiving an input image at a first computer system; encoding the input image using a first trained neural network to produce a latent representation; and transmitting the latent representation; wherein the first trained neural network has been trained according to the method above.

According to the present invention there is provided a method for lossy image or video receipt and decoding, the method comprising the steps of: receiving a latent representation at a second computer system; and decoding the latent representation using a second trained neural network to produce an output image, wherein the output image is an approximation of the input image; wherein the second trained neural network has been trained according to the method above.

According to the present invention there is provided a data processing system or apparatus configured to perform any of the methods above.

According to the present invention there is provided a computer program comprising instructions which, when the program is executed by a computer, cause the computer to carry out any of the methods above.

According to the present invention there is provided a computer-readable storage medium comprising instructions which, when executed by a computer, cause the computer to carry out any of the methods above.

BRIEF DESCRIPTION OF THE DRAWINGS

Aspects of the invention will now be described by way of examples, with reference to the following figures in which.

DETAILED DESCRIPTION OF THE INVENTION

Figure 1:
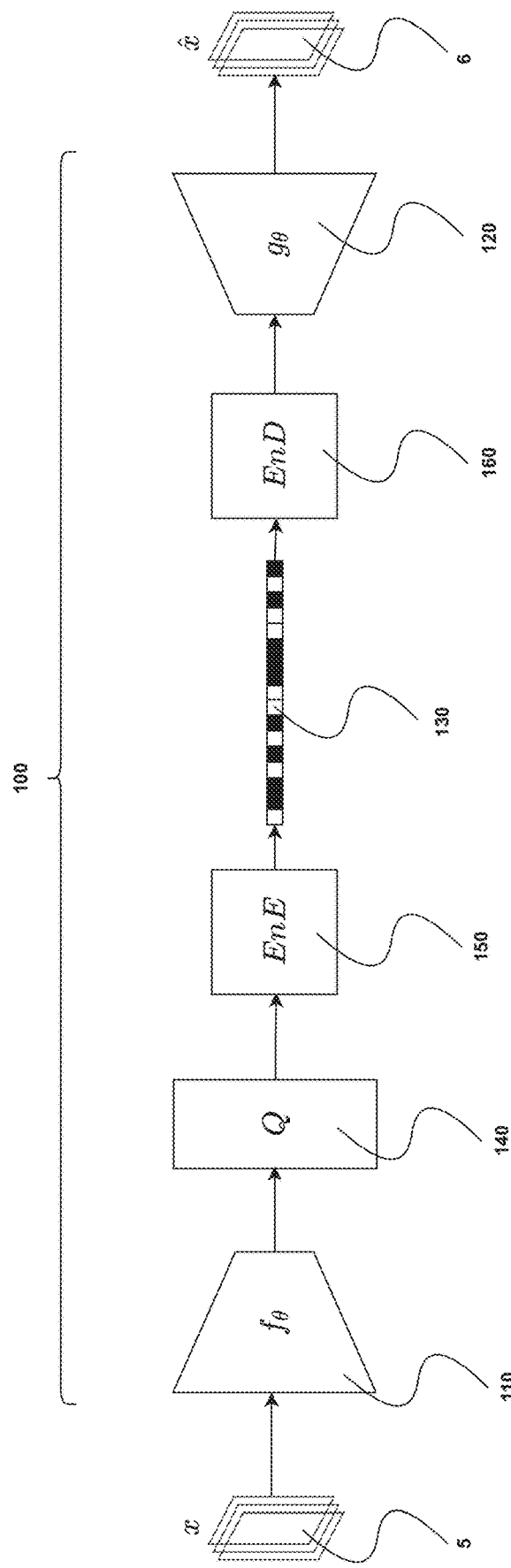
FIG. 1 illustrates an example of an image or video compression, transmission and decompression pipeline.

Compression processes may be applied to any form of information to reduce the amount of data, or file size, required to store that information. Image and video information is an example of information that may be compressed. The file size required to store the information, particularly during a compression process when referring to the compressed file, may be referred to as the rate. In general, compression can be lossless or lossy. In both forms of compression, the file size is reduced. However, in lossless compression, no information is lost when the information is compressed and subsequently decompressed. This means that the original file storing the information is fully reconstructed during the decompression process. In contrast to this, in lossy compression information may be lost in the compression and decompression process and the reconstructed file may differ from the original file. Image and video files containing image and video data are common targets for compression.

In a compression process involving an image, the input image may be represented as x. The data representing the image may be stored in a tensor of dimensions H×W×C, where H represents the height of the image, W represents the width of the image and C represents the number of channels of the image. Each H×W data point of the image represents a pixel value of the image at the corresponding location. Each channel C of the image represents a different component of the image for each pixel which are combined when the image file is displayed by a device. For example, an image file may have 3 channels with the channels representing the red, green and blue component of the image respectively. In this case, the image information is stored in the RGB colour space, which may also be referred to as a model or a format. Other examples of colour spaces or formats include the CMKY and the YCbCr colour models. However, the channels of an image file are not limited to storing colour information and other information may be represented in the channels. As a video may be considered a series of images in sequence, any compression process that may be applied to an image may also be applied to a video, Each image making up a video may be referred to as a frame of the video.

The output image may differ from the input image and may be represented by $\hat{x}$. The difference between the input image and the output image may be referred to as distortion or a difference in image quality. The distortion can be measured using any distortion function which receives the input image and the output image and provides an output which represents the difference between input image and the output image in a numerical way. An example of such a method is using the mean square error (MSE) between the pixels of the input image and the output image, but there are many other ways of measuring distortion, as will be known to the person skilled in the art. The distortion function may comprise a trained neural network.

Typically, the rate and distortion of a lossy compression process are related. An increase in the rate may result in a decrease in the distortion, and a decrease in the rate may result in an increase in the distortion. Changes to the distortion may affect the rate in a corresponding manner. A relation between these quantities for a given compression technique may be defined by a rate-distortion equation.

AI based compression processes may involve the use of neural networks. A neural network is an operation that can be performed on an input to produce an output. A neural network may be made up of a plurality of layers. The first layer of the network receives the input. One or more operations may be performed on the input by the layer to produce an output of the first layer. The output of the first layer is then passed to the next layer of the network which may perform one or more operations in a similar way. The output of the final layer is the output of the neural network.

Each layer of the neural network may be divided into nodes. Each node may receive at least part of the input from the previous layer and provide an output to one or more nodes in a subsequent layer. Each node of a layer may perform the one or more operations of the layer on at least part of the input to the layer. For example, a node may receive an input from one or more nodes of the previous layer. The one or more operations may include a convolution, a weight, a bias and an activation function. Convolution operations are used in convolutional neural networks. When a convolution operation is present, the convolution may be performed across the entire input to a layer. Alternatively, the convolution may be performed on at least part of the input to the layer.

Each of the one or more operations is defined by one or more parameters that are associated with each operation. For example, the weight operation may be defined by a weight matrix defining the weight to be applied to each input from each node in the previous layer to each node in the present layer. In this example, each of the values in the weight matrix is a parameter of the neural network. The convolution may be defined by a convolution matrix, also known as a kernel. In this example, one or more of the values in the convolution matrix may be a parameter of the neural network. The activation function may also be defined by values which may be parameters of the neural network. The parameters of the network may be varied during training of the network.

Other features of the neural network may be predetermined and therefore not varied during training of the network. For example, the number of layers of the network, the number of nodes of the network, the one or more operations performed in each layer and the connections between the layers may be predetermined and therefore fixed before the training process takes place. These features that are predetermined may be referred to as the hyperparameters of the network. These features are sometimes referred to as the architecture of the network.

To train the neural network, a training set of inputs may be used for which the expected output, sometimes referred to as the ground truth, is known. The initial parameters of the neural network are randomized and the first training input is provided to the network. The output of the network is compared to the expected output, and based on a difference between the output and the expected output the parameters of the network are varied such that the difference between the output of the network and the expected output is reduced. This process is then repeated for a plurality of training inputs to train the network. The difference between the output of the network and the expected output may be defined by a loss function. The result of the loss function may be calculated using the difference between the output of the network and the expected output to determine the gradient of the loss function. Back-propagation of the gradient descent of the loss function may be used to update the parameters of the neural network using the gradients $dL/dy$ of the loss function. A plurality of neural networks in a system may be trained simultaneously through back-propagation of the gradient of the loss function to each network.

In the context of image or video compression, this type of system, where simultaneous training with back-propagation through each element or the whole network architecture may be referred to as end-to-end, learned image or video compression. Unlike in traditional compression algorithms that use primarily handcrafted, manually constructed steps, an end-to-end learned system learns itself during training what combination of parameters best achieves the goal of minimising the loss function. This approach is advantageous compared to systems that are not end-to-end learned because an end-to-end system has a greater flexibility to learn weights and parameters that might be counter-intuitive to someone handcrafting features.

It will be appreciated that the term "training" or "learning" as used herein means the process of optimizing an artificial intelligence or machine learning model, based on a given set of data. This involves iteratively adjusting the parameters of the model to minimize the discrepancy between the model's predictions and the actual data, represented by the above-described rate-distortion loss function.

The training process may comprise multiple epochs. An epoch refers to one complete pass of the entire training dataset through the machine learning algorithm. During an epoch, the model's parameters are updated in an effort to minimize the loss function. It is envisaged that multiple epochs may be used to train a model, with the exact number depending on various factors including the complexity of the model and the diversity of the training data.

Within each epoch, the training data may be divided into smaller subsets known as batches. The size of a batch, referred to as the batch size, may influence the training process. A smaller batch size can lead to more frequent updates to the model's parameters, potentially leading to faster convergence to the optimal solution, but at the cost of increased computational resources. Conversely, a larger batch size involves fewer updates, which can be more computationally efficient but might converge slower or even fail to converge to the optimal solution.

The learnable parameters are updated by a specified amount each time, determined by the learning rate. The learning rate is a hyperparameter that decides how much the parameters are adjusted during the training process. A smaller learning rate implies smaller steps in the parameter space and a potentially more accurate solution, but it may require more epochs to reach that solution. On the other hand, a larger learning rate can expedite the training process but may risk overshooting the optimal solution or causing the training process to diverge.

The training described herein may involve use of a validation set, which is a portion of the data not used in the initial training, which is used to evaluate the model's performance and to prevent overfitting. Overfitting occurs when a model learns the training data too well, to the point that it fails to generalize to unseen data. Regularization techniques, such as dropout or L1/L2 regularization, can also be used to mitigate overfitting.

It will be appreciated that training a machine learning model is an iterative process that may comprise selection and tuning of various parameters and hyperparameters. As will be appreciated, the specific details, such as hyper parameters and so on, of the training process may vary and it is envisaged that producing a trained model in this way may achieved in a number of different ways with different epochs, batch sizes, learning rates, regularisations, and so on, the details of which are not essential to enabling the advantages and effects of the present disclosure, except where stated otherwise. The point at which an "untrained" neural network is considered be "trained" is envisaged to be case specific and depend on, for example, on a number of epochs, a plateauing of any further learning, or some other metric and is not considered to be essential in achieving the advantages described herein.

More details of an end-to-end, learned compression process will now be described. It will be appreciated that in some cases, end-to-end, learned compression processes may be combined with one or more components that are hand-crafted or trained separately.

In the case of AI based image or video compression, the loss function may be defined by the rate distortion equation. The rate distortion equation may be represented by Loss=$D+\lambda*R$, where D is the distortion function, $\lambda$ is a weighting factor, and R is the rate loss. $\lambda$ may be referred to as a lagrange multiplier. The langrange multiplier provides as weight for a particular term of the loss function in relation to each other term and can be used to control which terms of the loss function are favoured when training the network.

In the case of AI based image or video compression, a training set of input images may be used. An example training set, of input images is the KODAK image set (tor example at www.cs.albany.edu/xypan/research/snr/Kodak.html). An example training set of input images is the IMAX image set. An example training set of input images is the Imagenet dataset (for example at www.image-net.org/download). An example training set of input images is the CLIC Training Dataset P ("professional") and M ("mobile") (for example at http://challenge.compression.cc/tasks/).

An example of an AI based compression, transmission and decompression process 100 is shown in FIG. 1. As a first step in the AI based compression process, an input image 5 is provided. The input image 5 is provided to a trained neural network 110 characterized by a function $f_\theta$ acting as an encoder. The encoder neural network 110 produces an output based on the input image. This output is referred to as a latent representation of the input image 5. In a second step, the latent representation is quantised in a quantisation process 140 characterised by the operation Q, resulting in a quantized latent. The quantisation process transforms the continuous latent representation into a discrete quantized latent. An example of a quantization process is a rounding function.

In a third step, the quantized latent is entropy encoded in an entropy encoding process 150 to produce a bitstream 130. The entropy encoding process may be for example, range or arithmetic encoding. In a fourth step, the bitstream 130 may be transmitted across a communication network.

In a fifth step, the bitstream is entropy decoded in an entropy decoding process 160. The quantized latent is provided to another trained neural network 120 characterized by a function go acting as a decoder, which decodes the quantized latent. The trained neural network 120 produces an output based on the quantized latent. The output may be the output image of the AI based compression process 100. The encoder-decoder system may be referred to as an autoencoder.

Entropy encoding processes such as range or arithmetic encoding are typically able to losslessly compress given input data up to close to the fundamental entropy limit of that data, as determined by the total entropy of the distribution of that data. Accordingly, one way in which end-to-end, so learned compression can minimise the rate toss term of the rate-distortion loss function and thereby increase compression effectiveness is to learn autoencoder parameter values that produce low entropy latent representation distributions. Producing latent representations distributed with as low an entropy as possible allows entropy encoding to compress the latent distributions as close to or to the fundamental entropy limit, for that distribution. The lower the entropy of the distribution, the more entropy encoding can losslessly compress it and the lower the amount of data in the corresponding bitstream. In some cases where the latent representation is distributed according to a gaussian or Laplacian distribution, this learning may comprise learning optimal location and scale parameters of the gaussian or Laplacian distributions, in other cases, it allows the learning of more flexible latent representation distributions which can further help to achieve the minimising of the rate-distortion loss function in ways that are not intuitive or possible to do with handcrafted features. Examples of these and other advantages are described in WO2021/220008A1, which is incorporated in its entirety by reference.

Something which is closely linked to the entropy encoding of the latent distribution and which accordingly also has an effect on the effectiveness of compression of end-to-end learned approaches is the quantisation step. During inference, a rounding function may be used to quantise a latent representation distribution into bins of given sizes, a rounding function is not differentiable everywhere. Rather, a rounding function is effectively one or more step functions whose gradient is either zero (at the top of the steps) or infinity (at the boundary between steps), Back propagating a gradient, of a loss function through a rounding function is challenging. Instead, during training, quantisation by rounding function is replaced by one or more other approaches. For example, the functions of a noise quantisation model are differentiable everywhere and accordingly do allow back-propagation of the gradient of the loss function through the quantisation parts of the end-to-end, learned system. Alternatively, a straight-through estimator (STE) quantisation model or one other quantisation models may be used. It is also envisaged that different quantisation models may be used for during evaluation of different term of the loss function. For example, noise quantisation may used to evaluate the rate or entropy loss term of the rate-distortion loss function while STE quantisation may be used to evaluate the distortion term.

In a similar manner to how learning parameters top produce certain distributions of the latent representation facilitates achieving better rate loss term minimisation, end-to-end learning of the quantisation process achieves a similar effect. That is, learnable quantisation parameters provide the architecture with a further degree of freedom to achieve the goal of minimising the loss function. For example, parameters corresponding to quantisation bin sizes may be learned which is likely to result in an improved rate-distortion loss outcome compared to approaches using hand-crafted quantisation bin sizes.

Further, as the rate-distortion loss function constantly has to balance a rate loss term against a distortion loss term, it has been found that the more degrees of freedom the system has during training, the better the architecture is at achieving optimal rate and distortion trade off.

The system described above may be distributed across multiple locations and/or devices. For example, the encoder 110 may be located on a device such as a laptop computer, desktop computer, smart phone or server. The decoder 120 may be located on a separate device which may be referred to as a recipient device. The system used to encode, transmit and decode the input image 5 to obtain the output image 6 may be referred to as a compression pipeline.

Figure 2:
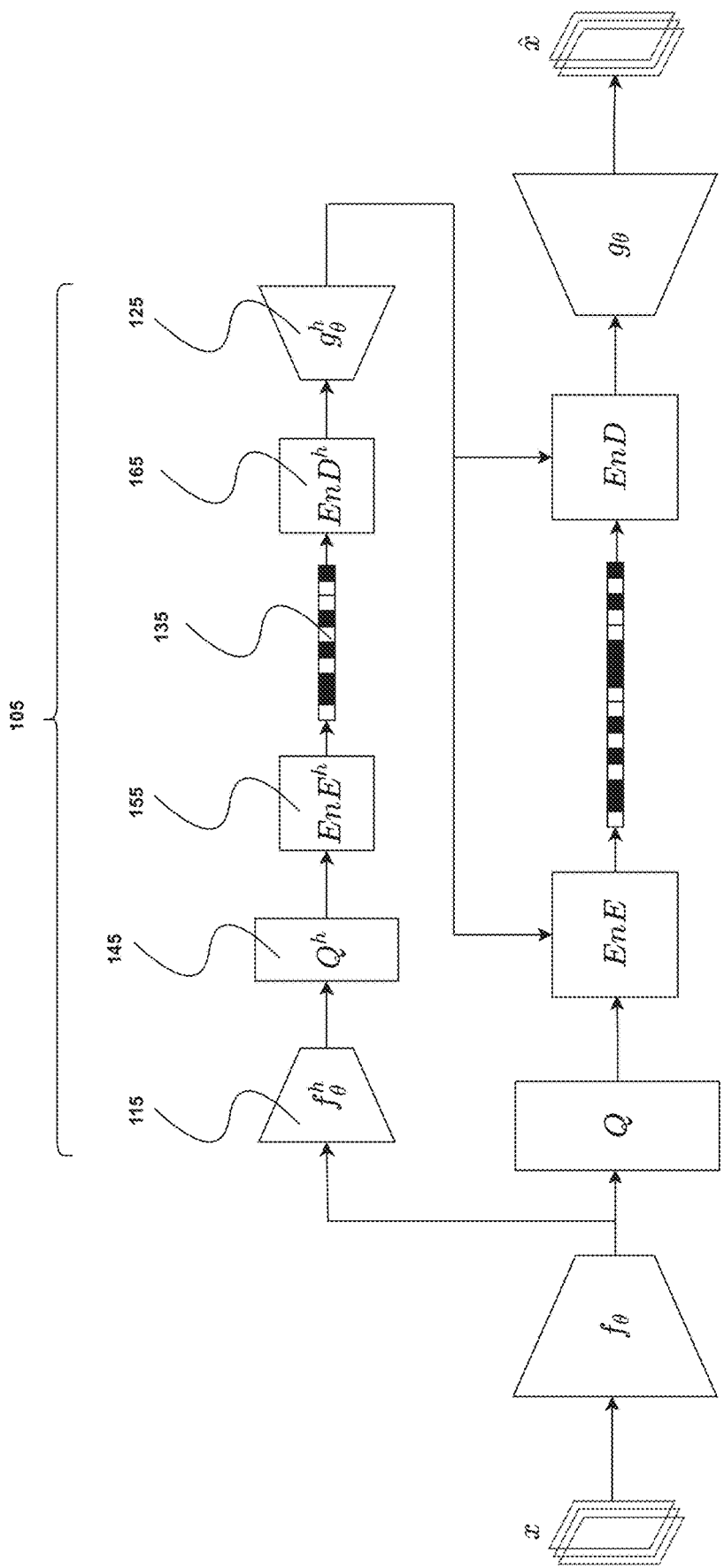
FIG. 2 illustrates a further example of an image or video compression, transmission and decompression pipeline including a hyper-network.

The AI based compression process may further comprise a hyper-network 105 for the transmission of meta-information that improves the compression process. The hyper-network 105 comprises a trained neural network 115 acting as a hyper-encoder $f_\theta^h$ and a trained neural network 125 acting as a hyper-decoder $g_\theta^h$. An example of such a system is shown in FIG. 2. Components of the system not further discussed may be assumed to be the same as discussed above. The neural network 115 acting as a hyper-decoder receives the latent that is the output of the encoder 110. The hyper-encoder 115 produces an output based on the latent representation that may be referred to as a hyper-latent representation. The hyper-latent is then quantized in a quantization process 145 characterised by $Q^h$ to produce a quantized hyper-latent. The quantization process 145 characterised by $Q^h$ may be the same as the quantisation process 140 characterised by Q discussed above.

In a similar manner as discussed above for the quantized latent, the quantized hyper-latent is then entropy encoded in an entropy encoding process 155 to produce a bitstream 135. The bitstream 135 may be entropy decoded in an entropy decoding process 165 to retrieve the quantized hyper-latent. The quantized hyper-latent is then used as an input to trained neural network 125 acting as a hyper-decoder. However, in contrast to the compression pipeline 100, the output of the hyper-decoder may not be an approximation of the input to the hyper-decoder 115. Instead, the output of the hyper-decoder is used to provide parameters for use in the entropy encoding process 150 and entropy decoding process 160 in the main compression process 100. For example, the output of the hyper-decoder 125 can include one or more of the mean, standard deviation, variance or any other parameter used to describe a probability model for the entropy encoding process 150 and entropy decoding process 160 of the latent representation. In the example shown in FIG. 2, only a single entropy decoding process 165 and hyper-decoder 125 is shown for simplicity. However, in practice, as the decompression process usually takes place on a separate device, duplicates of these processes will be present on the device used for encoding to provide the parameters to be used in the entropy encoding process 150.

Further transformations may be applied to at least one of the latent and the hyper-latent at any stage in the AI based compression process 100. For example, at least one of the latent and the hyper latent may be converted to a residual value before the entropy encoding process 150,155 is performed. The residual value may be determined by subtracting the mean value of the distribution of latents or hyper-latents from each latent or hyper latent. The residual values may also be normalised.

To perform training of the AI based compression process described above, a training set of input images may be used as described above. During the training process, the parameters of both the encoder 110 and the decoder 120 may be simultaneously updated in each training step. If a hyper-network 105 is also present, the parameters of both the hyper-encoder 115 and the hyper-decoder 125 may additionally be simultaneously updated in each training step. The training process may further include a generative adversarial network (GAN). When applied to an AI based compression process, in addition to the compression pipeline described above, an additional neutral network acting as a discriminator is included in the system. The discriminator receives an input and outputs a score based on the input providing an indication of whether the discriminator considers the input to be ground truth or fake. For example, the indicator may be a score, with a high score associated with a ground truth input and a low score associated with a fake input. For training of a discriminator, a loss function is used that maximizes the difference in the output indication between an input ground truth and input fake.

When a GAN is incorporated into the training of the compression process, the output image 6 may be provided to the discriminator. The output of the discriminator may then be used in the loss function of the compression process as a measure of the distortion of the compression process. Alternatively, the discriminator may receive both the input image 5 and the output image 6 and the difference in output indication may then be used in the loss function of the compression process as a measure of the distortion of the compression process. Training of the neural network acting as a discriminator and the other neutral networks in the compression process may be performed simultaneously. During use of the trained compression pipeline for the compression and transmission of images or video, the discriminator neural network is removed from the system and the output of the compression pipeline is the output image 6.

Incorporation of a GAN into the training process may cause the decoder 120 to perform hallucination. Hallucination is the process of adding information in the output image 6 that was not present in the input image 5. In an example, hallucination may add fine detail to the output image 6 that was not present in the input image 5 or received by the decoder 120. The hallucination performed may be based on information in the quantized latent received by decoder 120.

Details of a video compression process will now be described. As discussed above, a video is made up of a series of images arranged in sequential order. AI based compression process 100 described above may be applied multiple times to perform compression, transmission and decompression of a video. For example, each frame of the video may be compressed, transmitted and decompressed individually. The received frames may then be grouped to obtain the original video.

The frames in a video may be labelled based on the information from other frames that is used to decode the frame in a video compression, transmission and decompression process. As described above, frames which are decoded using no information from other frames may be referred to as I-frames. Frames which are decoded using information from past frames may be referred to as P-frames. Frames which are decoded using information from past frames and future frames may be referred to as B-frames. Frames may not be encoded and/or decoded in the order that they appear in the video. For example, a frame at a later time step in the video may be decoded before a frame at an earlier time.

The images represented by each frame of a video may be related. For example, a number of frames in a video may show the same scene. In this case, a number of different parts of the scene may be shown in more than one of the frames. For example, objects or people in a scene may be shown in more than one of the frames. The background of the scene may also be shown in more than one of the frames. If an object or the perspective is in motion in the video, the position of the object or background in one frame may change relative to the position of the object or background in another frame. The transformation of a part of the image from a first, position in a first frame to a second position in a second frame may be referred to as flow, warping or motion compensation. The flow may be represented by a vector. One or more flows that represent the transformation of at least part of one frame to another frame may be referred to as a flow map.

Figure 3:
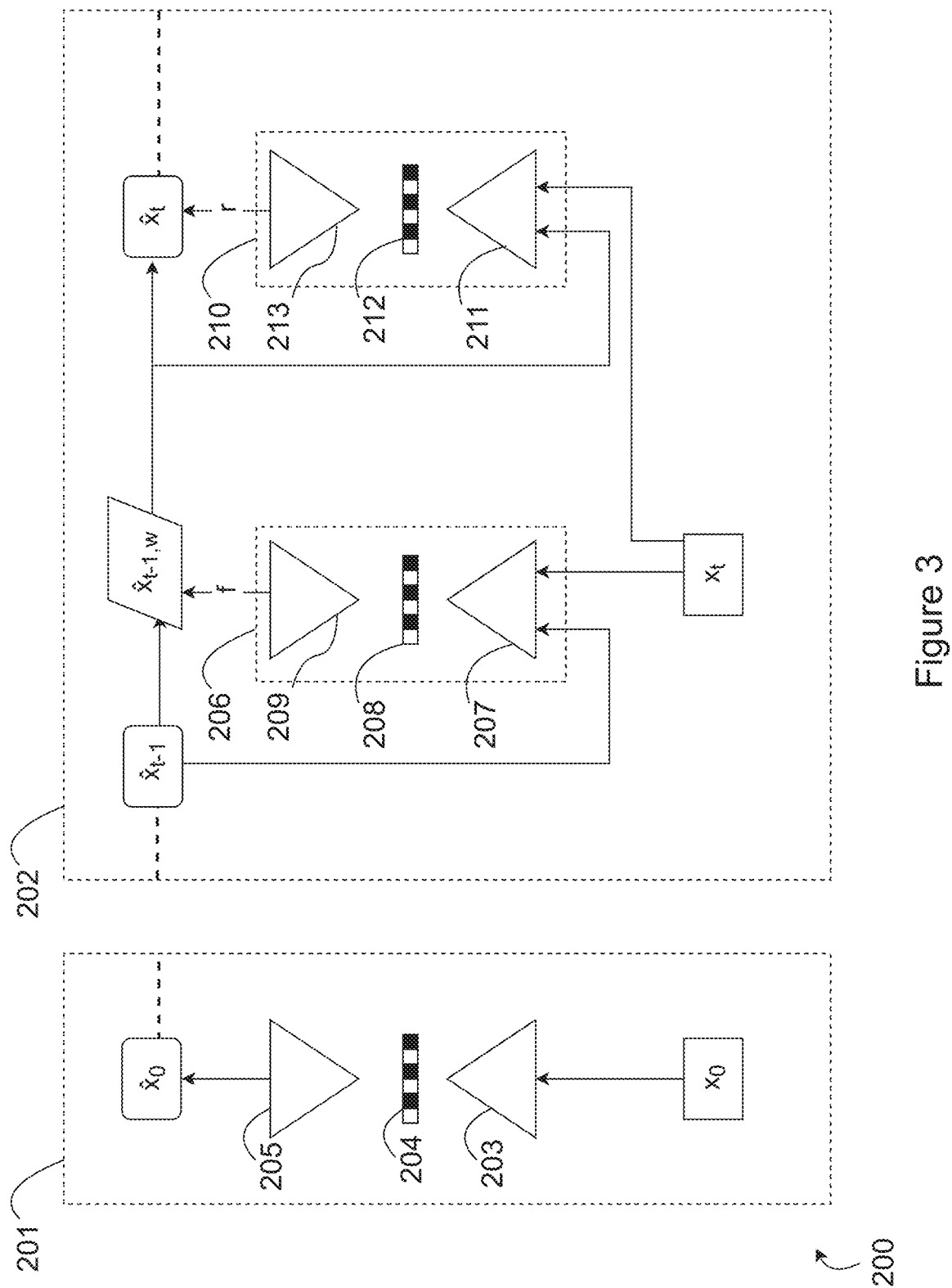
FIG. 3 illustrates an example of a video compression, transmission and decompression pipeline.

An example AI based video compression, transmission, and decompression process 200 is shown in FIG. 3. The process 200 shown in FIG. 3 is divided into an I-frame part 201 for decompressing I-frames, and a P-frame part 202 for decompressing P-frames. It will be understood that these divisions into different parts are arbitrary and the process 200 may be also be considered as a single, end-to-end pipeline.

As described above, I-frames do not rely on information from other frames so the I-frame part 201 corresponds to the compression, transmission, and decompression process illustrated in FIG. 1 or 2. The specific details will not be repeated here but, in summary, an input image $x_0$ is passed into an encoder neural network 203 producing a latent representation which is quantised and entropy encoded into a bitstream 204. The subscript 0 in $x_0$ indicates the input image corresponds to a frame of a video stream at position t=0. This may be the first frame of an entire video stream or the first frame of a chunk of a video stream made up of, for example, an I-frame and a plurality of subsequent P-frames and/or B-frames. The bitstream 204 is then entropy decoded and passed into a decoder neural network 205 to reproduce a reconstructed image $\hat{x}_0$ which in this case is an I-frame. The decoding step may be performed both locally at the same location as where the input image compression occurs as well as at the location where the decompression occurs. This allows the reconstructed image $\hat{x}_0$ to be available for later use by components of both the encoding and decoding sides of the pipeline.

In contrast to I-frames, P-frames (and B-frames) do rely on information from other frames. Accordingly, the P-frame part 202 at the encoding side of the pipeline takes as input not only the input image $x_t$ that is to be compressed (corresponding to a frame of a video stream at position t), but also one or more previously reconstructed images $\hat{x}_{t-1}$ from an earlier frame t−1. As described above, the previously reconstructed $\hat{x}_{t-1}$ is available at both the encode and decode side of the pipeline and can accordingly be used for various purposes at both the encode and decode sides.

At the encode side, previously reconstructed images may be used for generating a flow maps containing information indicative of inter-frame movement of pixels between frames. In the example of FIG. 3, both the image being compressed $x_t$ and the previously reconstructed image from an earlier frame $\hat{x}_{t-1}$ are passed into a flow module part 206 of the pipeline. The flow module part 206 comprises an autoencoder such as that of the autoencoder systems of FIGS. 1 and 2 but where the encoder neural network 207 has been trained to produce a latent representation of a flow map from inputs $\hat{x}_{t-1}$ and $x_t$, which is indicative of inter-frame movement of pixels or pixel groups between $\hat{x}_{t-1}$ and $x_t$. The latent representation of the flow map is quantised and entropy encoded to compress it and then transmitted as a bitstream 208. On the decode side, the bitstream is entropy decoded and passed to a decoder neural network 209 to produce a reconstructed flow map f.

The reconstructed flow map f is applied to the previously reconstructed image $\hat{x}_{t-1}$ to generate a warped image $\hat{x}_{t-1,w}$. It is envisaged that any suitable warping technique may be used, for example bi-linear or tri-linear warping, as is described in Agustsson, E., Minnen, D., Johnston, N., Balle, J., Hwang, S. J., and Toderici. G. (2020), Scale-space flow for end-to-end optimized video compression. In Proceedings of the IEEE/CVF Conference on Computer Vision and Pattern Recognition (pp. 8503-8512), which is hereby incorporated by reference. It is further envisaged that a scale-space flow approach as described in the above paper may also optionally be used. The warped image $\hat{x}_{t-1,w}$ is a prediction of how the previously reconstructed image $\hat{x}_{t-1}$ might have changed between frame positions t−1 and t, based on the output flow map produced by the flow module part 206 autoencoder system from the inputs of $\hat{x}_t$ and $\hat{x}_{t-1}$.

As with the I-frame, the reconstructed flow map f and corresponding warped image $\hat{x}_{t-1,w}$ may be produced both on the encode side and the decode side of the pipeline so they are available for use by other components of the pipeline on both the encode and decode sides.

In the example of FIG. 3, both the image being compressed $x_t$ and $\hat{x}_{t-1,w}$ the are passed into a residual module part 210 of the pipeline. The residual module part 210 comprises an autoencoder system such as that of the autoencoder systems of FIGS. 1 and 2 but where the encoder neural network 211 has been trained to produce a latent representation of a residual map indicative of differences between the input mage $x_t$ and the warped image $\hat{x}_{t-1,w}$. The latent representation of the residual map is then quantised and entropy encoded into a bitstream 212 and transmitted. The bitstream 212 is then entropy decoded and passed into a decoder neural network 213 which reconstructs a residual map r from the decoded latent representation. Alternatively, a residual map may first be pre-calculated between $x_t$ and the $\hat{x}_{t-1,w}$ and the pre-calculated residual map may be passed into an autoencoder for compression only. This hand-crafted residual map approach is computationally simpler, but reduces the degrees of freedom with which the architecture may learn weights and parameters to achieve its goal during training of minimising the rate-distortion loss function.

Finally, on the decode side, the residual map r is applied (e.g. combined by addition, subtraction or a different operation) to the warped image to produce a reconstructed image $\hat{x}_t$ which is a reconstruction of image $x_t$ and accordingly corresponds to a P-frame at position t in a sequence of frames of a video stream. It will be appreciated that the reconstructed image $\hat{x}_t$ can then be used to process the next frame. That is, it can be used to compress, transmit and decompress $x_{t+1}$, and so on until an entire video stream or chunk of a video stream has been processed.

Thus, for a block of video frames comprising an I-frame and n subsequent P-frames, the bitstream may contain (i) a quantised, entropy encoded latent representation of the I-frame image, and (ii) a quantised, entropy encoded latent representation of a flow map and residual map of each P-frame image. For completeness, whilst not illustrated in FIG. 3, any of the autoencoder systems of FIG. 3 may comprise hyper and hyper-hyper networks such as those described in connection with FIG. 2. Accordingly, the bitstream may also contain hyper and hyper-hyper parameters, their latent quantised, entropy encoded latent representations and so on, of those networks as applicable.

Finally, the above approach may generally also be extended to B-frames, for example as is described in Pourreza, R., and Cohen, T. (2021). Extending neural p-frame codecs for b-frame coding. In Proceedings of the IEEE/CVF International Conference on Computer Vision (pp. 6680-6689).

The above-described flow and residual based approach is highly effective at reducing the amount of data that needs to be transmitted because, as long as at least one reconstructed frame (e.g. I-frame $\hat{x}_{t-1}$) is available, the encode side only needs to compress and transmit a flow so map and a residual map (and any hyper or hyper-hyper parameter information, as applicable) to reconstruct a subsequent frame.

Figure 4:
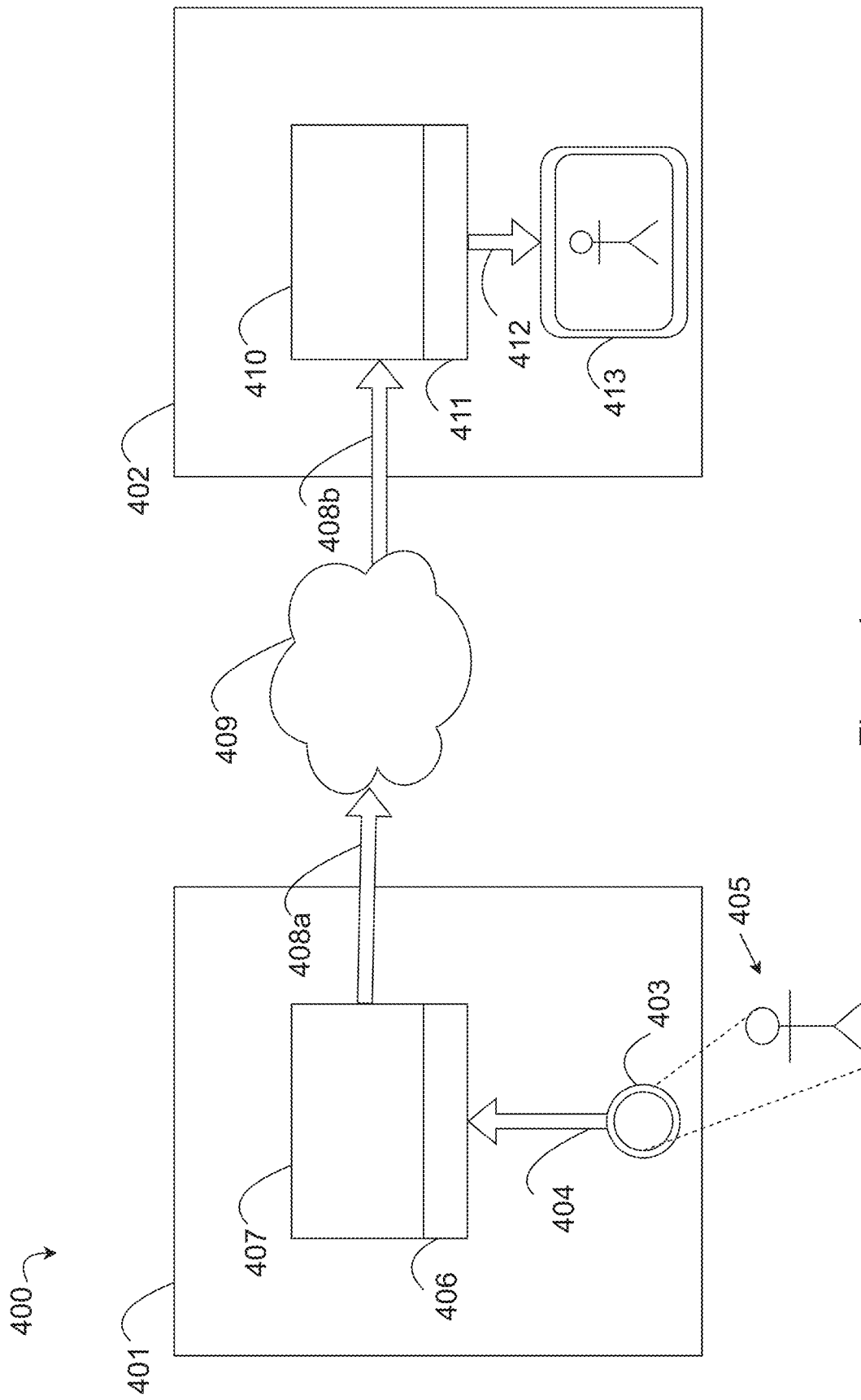
FIG. 4 illustrates an example of a video compression, transmission and decompression system.

FIG. 4 shows an example of an AI image or video compression process such as that described above in connection with FIGS. 1-3 implemented in a video streaming system 400. The system 400 comprises a first device 401 and a second device 402. The first and second devices 401, 402 may be user devices such as smartphones, tablets, AR/VR headsets or other portable devices. In contrast to known systems which primarily perform inference on GPUs such as Nvidia A100, Geforce 3090, Gefore 4090 GPU cards, the system 400 of FIG. 4 performs inference on a CPU of the first and second devices respectively. That is, compute for performing both encoding and decoding are performed by the respective CPUs of the first and second devices 401, 402, This places very different power usage, memory and runtime constraints on the implementation of the above methods than when implementing AI-based compression methods on GPUs. In one example, the CPU of first and second devices 401, 402 may comprise a Qualcomm Snapdragon CPU.

The first device 401 comprises a media capture device 403, such as a camera, arranged to capture a plurality of images, referred to hereafter as a video stream 404, of a scene 404. The video stream 404 is passed to a pre-processing module 406 which splits the video stream into blocks of frames, various frames of which will be designated as I-frames, P-frames, and/or B-frames. The blocks of frames are then compressed by an AI-compression module 407 comprising the encode side of the AI-based video compression pipeline of FIG. 3. The output of the AI-compression module is accordingly a bitstream 408a which is transmitted from the first device 401, for example via a communications channel, for example over one or more of a WiFi, 3G, 4G or 5G channel, which may comprise internet or cloud-based 409 communications.

The second device 402 receives the communicated bitstream 408b which is passed to an AI-decompression module 410 comprising the decode side of the AI-based video compression pipeline of FIG. 3. The output of the AI-decompression module 402 is the reconstructed I-frames, P-frames and/or B-frames which are passed to a post-processing module 411 where they can prepared, for example passed into a buffer, in preparation for streaming 412 to and rendering on a display device 413 of the second device 402.

It is envisaged that the system 400 of FIG. 4 may be used for live video streaming at 30 fps of a 1080p video stream, which means a cumulative latency of both the encode and decode side is below substantially 50 ms, for example substantially 30 ms or less. Achieving this level of runtime performance with only CPU compute on user devices presents challenges which are not addressed by known methods and systems or in the wider AI-compression literature.

For example, execution of different parts of the compression pipeline during inference so may be optimized by adjusting the order in which operations are performed using one or more known CPU scheduling methods. Efficient scheduling can allow for operations to be performed in parallel, thereby reducing the total execution time, it is also envisaged that efficient management of memory resources may be implemented, including optimising caching methods such as storing frequently-accessed data in faster memory locations, and memory reuse, which minimizes memory allocation and deallocation operations.

Concepts related to the AI compression processes discussed above will now be described. One or more of the concepts described below may be applied in an AI based compression process as described above.

A control loop mechanism used for controlling a given process variable (i.e. PV) for reaching a desired setpoint (i.e. SP) by adjusting the value of a control variable (i.e. CV or as denoted below with u(t)) will now be discussed together with its application to an AI based compression process. A PID controller is an example of such a mechanism.

Such a control loop is equivalent to bringing the error which may be defined as the difference between the current value of the process variable and the setpoint e(t)=PV(t)−SP close to 0. Note, with t we denote the dependency of the process on time. The setpoint may be predetermined, for example set at a particular value for the entire training process. Alternatively, the setpoint may be modified during the training process, for example by increasing or decreasing a particular setpoint between at least one of the training steps.

The PID controller changes the control variable, based on the values of e(t) with an integral, proportional and derivative terms:

$$u(t) = K_i \int_0^t e(\tau)d\tau + K_p e(t) + K_d \frac{de(t)}{dt} \quad (1)$$

The controller may parameterised by the three term coefficients $K_i$, $K_p$, $K_d$. These parameters may scale the contribution of each of the terms to the control process. The parameters may be set to zero to remove one or more of the terms.

An analogous definition of the PID controller can be obtained by differentiating both sides of eq.1 w.r.t. t and setting initial value for u(0):

$$\frac{du(t)}{dt} = K_i e(t) + K_p \frac{de(t)}{dt} + K_d \frac{d^2 e(t)}{dt^2} \quad (2)$$

Often the PID controller is applied in a discrete setting (i.e. the time variable t is discretised). In algorithm 1 we present pseudocode for the discrete algorithm:

Algorithm 1 Discrete algorithm for PID control from eq.2. Here the functions error_derivative_estimate(errors, dt) and error_second_derivative_estimate(errors, dt) produce estimates of the first and second order derivatives of error, based on evaluations of the error function at discrete time steps. This can be, achieved with finite difference numerical differentiation, Inputs:
Discrete time interval: dt.
Initial value for control variable: control_variable=u(0)
Integral coefficient: $K_i$
Proportional coefficient: $K_p$
Derivative coefficient: $K_d$
Procedure:
control_variable←u(0)
errors←[ ]
loop:
error←PV-SP
errors←errors+[error]
integral←error
proportional←error_derivative_estimate(errors, dt)
derivative←error_second_derivative_estimate(errors, dt)
control_variable_delta←Ki×integral+Kp×proportional+ Kd×derivative
control_variable←control_variable+control_variable_ delta
wait(dt)
goto loop In the usual setting the PID controller is used for controlling processes, determined by a deterministic function. However, whenever the process is stochastic in nature, it is helpful to apply smoothening (for example, some form of averaging) to the deltas that change the control variable. This means that the value of at least one previous update to the control variable is used during the current update. control_variable_delta could be interpreted as a control_variable_step (similar to a gradient step in gradient-based optimisation). A way of achieving this smoothening is by passing control_variable_step through a gradient descent/ascent optimiser (e.g. SGD, Adagrad, RMSProp, Adam). Many of those stochastic optimisers feature a momentum term, which applies an exponential moving average of updates. Such a process can be added to the trailing process of an AI based compression system as discussed above.

With the optimiser in mind the updated algorithm is presented in algorithm 2

Algorithm 2 Modified version of the discrete algorithm for PID control from algo.1 with the addition of gradient descent/ascent optimiser, Inputs:
Discrete time interval: dt.
Initial value for control variable: control_variable=u(0)
Integral coefficient: $K_i$
Proportional coefficient: $K_p$
Derivative coefficient: $K_d$
Gradient descent/ascent optimiser: optim((e.g. Adam)
Optimiser's initialisation parameters: optim_params (e.g. learning_rate, momentum_coefficient)
Procedure:
control_variable←u(0)
errors←[ ]
optim=optim(optim_params)
loop:
errors←PV-SP
errors←errors+[error]
integral←error
proportional←error_derivative_estimate(errors, dt)
derivative←error_second_derivative_estimate(errors, dt)
control_variable_step←Ki×integral+Kp×proportional+ Kd×derivative
optim.add_new_step(control_variable_step)
control_variable_modified_step←optim.get_modified_ step
control_variable←control_variable+control_variable_modified_step
wait (dt)
goto loop The optimiser-based discrete PID controller can be employed in the context of learning-based compression for controlling different metrics (i.e. process variables) in the loss function of an AI based compression process.

An example, of such process variable is the fake_out value produced by the discriminator in a compression pipeline, which indicates what is the discriminator's estimated likelihood of a compressed image or video of being real as discussed above. A stronger discriminator would results in low fake_out values, while a weaker one—in high fake_out values. There is an optimal fake_out value that leads to the best adversarial training between the encoder-decoder and the discriminator.

In order to reach a desired value for fake_out, one option is to change the learning rate of the discriminator (i.e. lr_disc or our control variable). The relationship between the lr_disc and fake_out is an unknown function and this is why a controller is desired. Other options of a control variable for controlling the fake_out are lambda_adv (i.e. the multiplier for the adversarial loss of the generator) and lambda_jp (i.e. the multiplier for the Jacobian penalty loss of the discriminator).

Another example of how the optimiser-based PID controller can be used in the context of learning-based compression is for rate control. In that scenario the multiplier for the rate or the distortion loss could be used as a control variable.

The subject matter and the functional operations described in this specification can be implemented in digital electronic circuitry, in tangibly-embodied computer software or firmware, in computer hardware, including the structures disclosed in this specification and their structural equivalents, or in combinations of one or more of them. The subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to Hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a VR headset, a game console, a Global Positioning System (UPS) receiver, a server, a mobile phones, a tablet computer, a notebook computer, a music player, an e-book reader, a laptop or desktop computer, a PDAs, a smart phone, or other stationary or portable devices, that includes one or more processors and computer readable media, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should be construed as descriptions of features that may be specific to particular examples of particular inventions. Certain features that are described in this specification in the context of separate examples can also be implemented in combination in a single example. Conversely, various features that are described in the context of a single example can also be implemented in multiple examples separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the examples described above should not be understood as requiring such separation in all examples, and it should be understood that the described program components and systems can generally be integrated together in a single software product, or packaged into multiple software products.

We claim:

1. A method of training one or more neural networks, the one or more neural networks being for use in lossy image or video encoding, transmission and decoding, the method comprising the steps of:
   receiving an input image at a first computer system;
   encoding the input image using a first neural network to produce a latent representation;
   decoding the latent representation using a second neural network to produce an output image, wherein the output image is an approximation of the input image;
   evaluating a function based on a difference between the output image and the input image;
   updating the parameters of the first neural network and the second neural network based on the evaluated function; and
   repeating the above steps using a first set of input images to produce a first trained neural network and a second trained neural network;
   wherein the difference between the output image and the input image is determined based on the output of a neural network acting as a discriminator;
   the parameters of the neural network acting as a discriminator are additionally updated based on the evaluated function; and
   the parameters of the neural network acting as a discriminator are updated at a first learning rate;
   wherein, after at least one of the updates of the parameters of the neural network acting as a discriminator, the first learning rate is updated; and
   the update to the first learning rate is based on an error of the output of the neural network acting as a discriminator.

2. The method of claim 1, wherein the error is based on a difference between the output of the neural network acting as a discriminator and a target value.

3. The method of claim 2, wherein the target value is predetermined.

4. The method of claim 2, wherein the target value is modified in at least one of the repeats of the training steps.

5. The method of claim 1, wherein the update to the first learning rate is based on a calculation comprising the error.

6. The method of claim 1, wherein the update to the first learning rate is based on a calculation comprising the integral of the error.

7. The method of claim 1, wherein the update to the first learning rate is based on a calculation comprising the derivative of the error.

8. The method of claim 3, wherein the contribution of at least one of the error, the integral of the error and the derivative of the error is scaled by a predetermined value.

9. The method of claim 1, wherein the update to the first learning rate is additionally based on an update to the first learning rate in at least one previous repeat of the training steps.

10. The method of claim 9, wherein the update to the first learning rate comprises the step of:
    determining a current modification of the first learning rate based on an error of the output of the neural network acting as a discriminator; and
    the update to the first learning rate is based on an average of the current modification of the first learning rate and the update to the first learning rate in at least one previous repeat of the training steps.

11. The method of claim 10, wherein the average is an exponential moving average.

12. The method of claim 1, wherein the update to the first learning rate is based on the output of a gradient descent algorithm which receives the error of the output of the neural network acting as a discriminator as an input.

13. The method of claim 12, wherein the gradient descent algorithm is one of the following algorithms: SGD, Adagrand, RMSProp or Adam.

14. A method for lossy image or video encoding, transmission and decoding, the method comprising the steps of:
    receiving an input image at a first computer system;
    encoding the input image using a first trained neural network to produce a latent representation;
    transmitting the latent representation to a second computer system;
    decoding the latent representation using a second trained neural network to produce an output image, wherein the output image is an approximation of the input image;
    wherein at least one of the first trained neural network and the second trained neural network has been trained according to the method of claim 1.

15. A data processing system configured to perform the method of claim 1.

* * * * *